US008956027B2

(12) United States Patent
Ishida

(10) Patent No.: US 8,956,027 B2
(45) Date of Patent: Feb. 17, 2015

(54) VEHICULAR HEADLAMP

(75) Inventor: Hiroyuki Ishida, Shizuoka (JP)

(73) Assignee: Koito Manufacturing Co., Ltd. (JP)

( * ) Notice: Subject to any disclaimer, the term of this patent is extended or adjusted under 35 U.S.C. 154(b) by 58 days.

(21) Appl. No.: 13/545,168

(22) Filed: Jul. 10, 2012

(65) Prior Publication Data

US 2013/0021817 A1 Jan. 24, 2013

(30) Foreign Application Priority Data

Jul. 19, 2011 (JP) ................................ 2011-158103

(51) Int. Cl.
*F21V 7/00* (2006.01)
*B60Q 1/00* (2006.01)
*B60Q 3/00* (2006.01)
*F21V 11/00* (2006.01)
*F21V 17/02* (2006.01)
*F21S 8/10* (2006.01)

(52) U.S. Cl.
CPC ......... *F21S 48/1159* (2013.01); *F21S 48/1352* (2013.01); *F21S 48/1388* (2013.01)
USPC ........... 362/517; 362/538; 362/539; 362/518; 362/514; 362/296.01; 362/297

(58) Field of Classification Search
CPC . F21S 48/125; F21S 48/1154; F21S 48/1159; F21S 48/1388; F21S 48/1784; F21S 48/1757; F21S 48/1258; F21S 48/1266; Y10S 362/80; H01L 33/60
USPC ............ 362/517, 518, 514, 512, 538, 296.01, 362/297
See application file for complete search history.

(56) References Cited

U.S. PATENT DOCUMENTS

| | | | | | |
|---|---|---|---|---|---|
| 6,059,435 | A * | 5/2000 | Hamm et al. | ................ | 362/514 |
| 7,708,439 | B2 * | 5/2010 | Naganawa et al. | ........... | 362/514 |
| 2006/0285341 | A1 * | 12/2006 | Yatsuda et al. | ................ | 362/464 |
| 2007/0183166 | A1 * | 8/2007 | Albou | .......................... | 362/514 |
| 2008/0239740 | A1 * | 10/2008 | Nakada et al. | ................ | 362/507 |

FOREIGN PATENT DOCUMENTS

| | | |
|---|---|---|
| JP | 2009076377 | 4/2009 |

* cited by examiner

*Primary Examiner* — Peggy Neils
*Assistant Examiner* — William N Harris
(74) *Attorney, Agent, or Firm* — Cantor Colburn LLP

(57) ABSTRACT

A projector lens of a vehicular headlamp has a shape of a convex lens in which the upper and lower portions are cut by a predetermined amount. A light source is disposed above optical axis Ax of the projector lens while a light emission surface is inclined downwardly. A first reflecting mirror has an elliptical reflective surface, and is adjusted in size such that almost all the light reflected from the reflective surface is incident on the projector lens. A shield plate is disposed in the vicinity of the focus of the first reflecting mirror to form a horizontal cutoff line. A second reflecting mirror is disposed to reflect light that is not incident on the first reflecting mirror. The third reflecting mirror is disposed above the upper end of the shield plate at a position that does not interfere with the light reflected from the first reflecting mirror.

7 Claims, 5 Drawing Sheets

(PRIOR ART)

VEHICULAR HEADLAMP

CROSS-REFERENCE TO RELATED APPLICATIONS

This application is based on and claims priority from Japanese Patent Application No. 2011-158103, filed on Jul. 19, 2011, with the Japanese Patent Office, the disclosure of which is incorporated herein in its entirety by reference.

TECHNICAL FIELD

The present disclosure relates to a vehicular headlamp.

BACKGROUND

A vehicular headlamp may be equipped with two or more reflectors to achieve specific purposes. For example, Japanese Patent Application Laid-Open No. 2009-76377 discloses an LED lamp unit in which three reflectors are installed to dispose a heat sink on a top surface of an LED-mounting substrate.

The projector lens of the vehicular headlamp significantly influences on the external appearance of the front surface of a vehicle. Also, there is a demand to narrow a longitudinal width of a projector lens (for example, about 20 mm) to improve the design. However, when merely narrowing the vertical width of a projector lens, the light flux and the amount of light incident on the projection lens are decreased, which is problematic.

SUMMARY

The present disclosure has been made in an effort to provide a technique that can secure the same amount of light in a vehicular headlamp equipped with a convex-shape projector lens in which an upper and a lower portions are cut out by a predetermined amount, as in a vehicular headlamp equipped with a projector lens in which an upper and a lower portions are not cut out.

A vehicular headlamp comprising: a projector lens having a shape where a vertical width is narrower than a horizontal width; a light source disposed above the optical axis of the projector lens while a light emission surface thereof is inclined downwardly; a first reflecting mirror having an elliptical reflective surface that reflects light emitted from the light source, and adjusted in size such that almost all the light beam reflected from the reflective surface is incident on the projector lens; a shield plate disposed in the vicinity of the focus of the first reflecting mirror and forming a horizontal cutoff line in a light distribution pattern projected from the projector lens; a second reflecting mirror disposed to reflect light which is emitted from the light source and is not incident on the first reflecting mirror; and a third reflecting mirror disposed above the upper end of the shield plate at a position that does not interfere with the light reflected from the first reflecting mirror, and reflecting the light reflected from the second reflecting mirror toward the projector lens.

According to the aspect, since the light, which is reflected from a first reflecting mirror and is not incident on a projector lens, is made to be incident on a projector lens by a second reflecting mirror and a third reflecting mirror, it is possible to secure the same amount of light as in a vehicular headlamp equipped with a common projector lens, even when the upper and lower portions of the convex lens of the projector lens of a vehicular headlamp are cut out by a predetermined amount.

In the vehicular headlamp, the second reflecting mirror has an elliptical reflective surface, the third reflecting mirror has a parabolic reflective surface, and the focuses of the reflective surfaces are positioned above the upper end of the shield plate.

In the vehicular headlamp, the shape of the elliptical reflective surface of the second reflecting mirror is adjusted such that light is incident on the entire surface of the third reflecting mirror. Further, the shape of the elliptical reflective surface of the second reflecting mirror is adjusted such that light is incident intensively on a side of the third reflecting mirror, which is located near the rear side of the vehicle.

Further, in the vehicular headlamp, the shapes of the elliptical reflective surface of the second reflecting mirror and the parabolic reflective surface of the third reflecting mirror are adjusted such that a light distribution pattern formed by the light reflected from the third reflecting mirror becomes horizontally expanded as compared to a light distribution pattern formed by the light reflected from the first reflecting mirror.

Therefore, according to the present disclosure, it is possible to secure the same amount of light as in a vehicular headlamp equipped with a projector lens of which the upper and lower portions of a convex lens are not cut out, even when the upper and lower portions of the convex lens of the projection lens are cut out by a predetermined amount.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, a vehicular headlamp of the related art will be described with reference to FIGS. 1 to 3 and then a vehicular headlamp according to an exemplary embodiment of the present disclosure will be described with reference to FIG. 4 to FIG. 7. Meanwhile, FIG. 1 to FIG. 3 illustrate the cross-sectional views representing a vertical plane including an optical axis of a vehicular headlamp.

Figure 1:
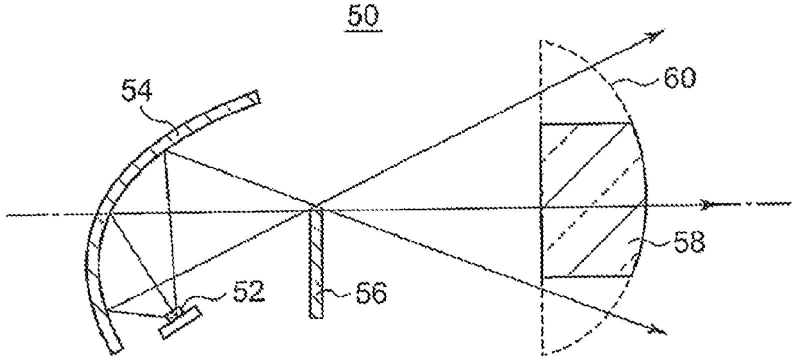
FIG. 1 is a schematic cross-sectional view illustrating a projector type of vehicular headlamp of the related art.

FIG. 1 illustrates a schematic cross-sectional view of a projector type vehicular headlamp 50 of the related art. Light emitted from a light source 52 such as an LED is reflected by a reflector 54. A portion of the light reflected from reflector 54 is blocked by a shade 56 and the remaining portion of the light is incident on a projector lens 60 (partially indicated by a dotted line) positioned at the front side of a vehicle. In vehicular headlamp 50, a projector lens 58 is considered in which the vertical width is made smaller than the horizontal width by cutting out the upper and lower portions of projector lens 60 by a predetermined amount. Projector lens 58 with a small vertical width is aimed at achieving an improved design effect when seen from the front side of the vehicle. However, since the light beam incident on the upper and lower portions of common projector lens 60 (the parts indicated by dotted lines in the figure) among the light beam reflected from reflector 54 are not incident on projector lens 58 having a small vertical width, the light flux becomes insufficient.

Figure 2:
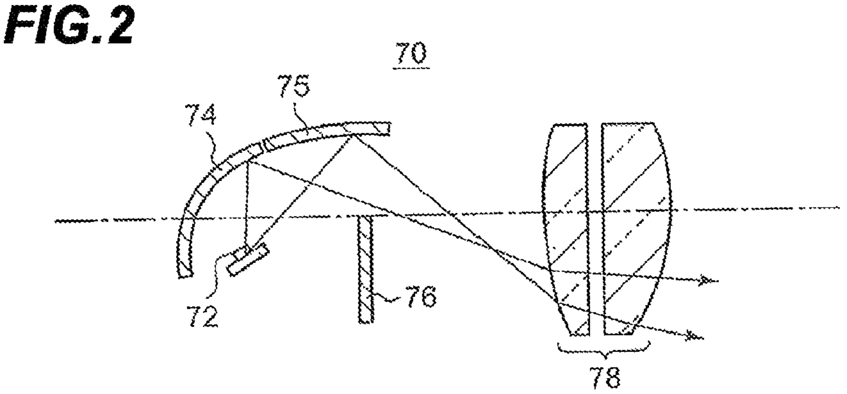
(PRIOR ART) FIG.2
FIG. 2 is a schematic cross-sectional view illustrating a vehicular headlamp configured to compensate insufficient light flux of the vehicular headlamp of FIG. 1.

FIG. 2 is a schematic cross-sectional view illustrating a vehicular headlamp 70 configured to compensate for insufficient light flux of vehicular headlamp 50 illustrated in FIG. 1. In vehicular headlamp 70, light emitted from light source 72 is reflected from a first reflector 74 and is incident on a projector lens 78 positioned at the front of the vehicle. A second reflector 75 is further disposed on the line extending from the first reflector and also reflects the light emitted from light source 72. The light reflected from second reflector 75 is incident on projector lens 78 by passing through a position spaced apart from the upper end of a shade 76. With this configuration, the problem that the light flux in projector lens 78 is insufficient may be resolved. However, the light passing through the position spaced apart from the upper end of shade 76 is projected to the front area of a road surface, that is, the area close to the front of the vehicle. As a result, the front area of the road surface becomes too bright, which is not preferable in terms of visibility.

Figure 3:
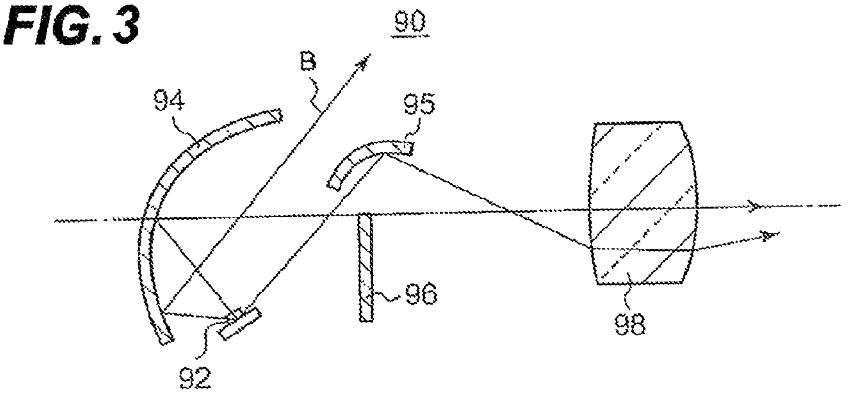
(PRIOR ART) FIG.3
FIG. 3 is a schematic cross-sectional view illustrating a vehicular headlamp configured to compensate for defects of the vehicular headlamp of FIG. 2.

FIG. 3 is a cross-sectional view schematically illustrating a vehicular headlamp 90 configured to compensate for defects of vehicular headlamp 70 illustrated in FIG. 2. Vehicular headlamp 90 includes a light source 92, a first reflector 94, a second reflector 95, a shade 96, and a projector lens 98. In this configuration, second reflector 95 is disposed to be closer to the optical axis in comparison to second reflector 75 of FIG. 2, such that the light reflected from second reflector 95 is incident on the vicinity of center of projector lens 98. As a result, it is possible to prevent the front area of a road surface from being too bright. In this configuration, however, a discontinuous portion occurs between first reflector 94 and second reflector 95, and the light leaks through the discontinuous portion (indicated by an arrow B in FIG. 3), such that the light flux becomes insufficient, as in the example of FIG. 1.

Figure 4:
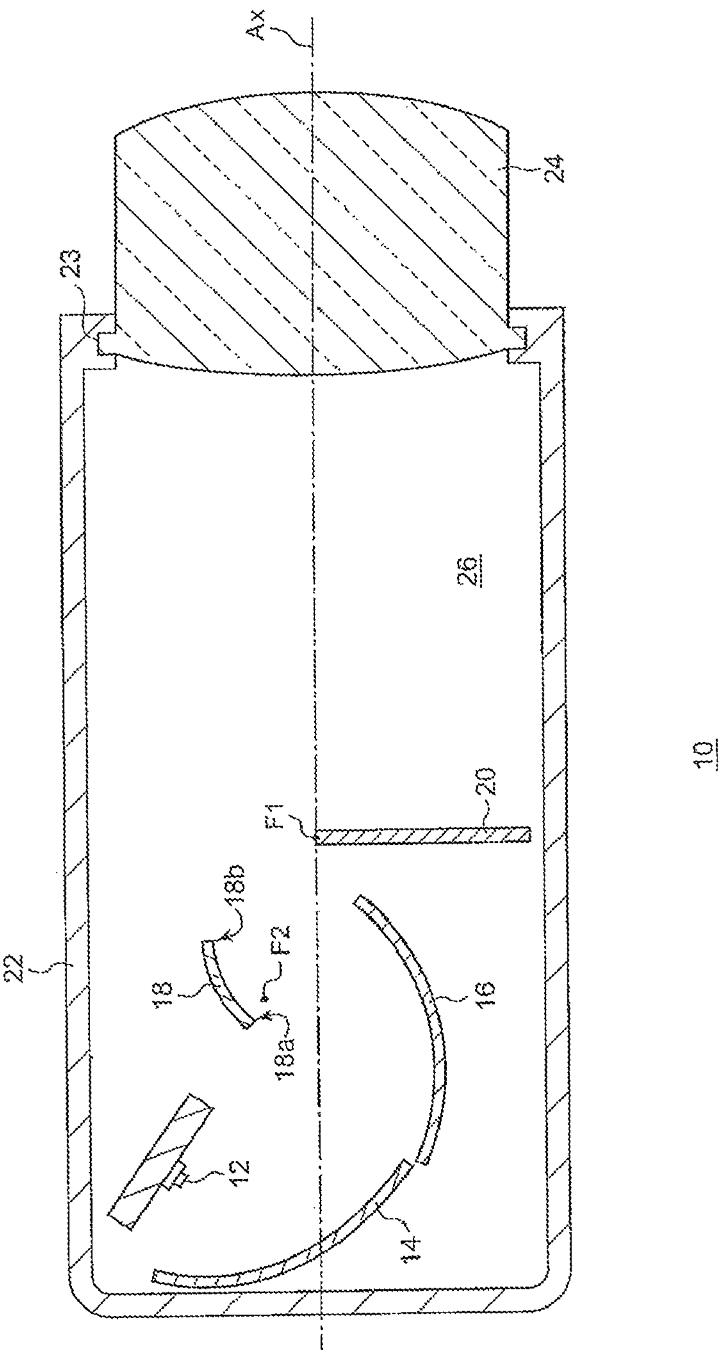
FIG. 4 is a schematic cross-sectional view illustrating a vehicular headlamp according to an exemplary embodiment view of the present disclosure.

FIG. 4 is a cross-sectional view schematically illustrating a vehicular headlamp 10 according to an exemplary embodiment of the present disclosure for resolving the drawbacks of the conventional vehicular headlamps described above. FIG. 4 illustrates a cross-section representing a vertical plane including an optical axis Ax of vehicular headlamp 10.

In vehicular headlamp 10, a lamp room 26 is formed with a lamp body 22 having a front opening and a projector lens 24 disposed to cover the front opening, and a light source and a reflecting mirror are disposed in lamp room 26.

Vehicular headlamp 10 can form a predetermined light distribution pattern on a virtual vertical screen, for example, disposed at 25 m ahead of the vehicle by turning ON the light source. Although the light distribution is controlled such that a light distribution pattern for a low beam is formed when the light source is turned ON in the present exemplary embodiment, the light distribution may be controlled such that different light distribution patterns such as a light distribution pattern for a high beam may be formed.

The peripheral edge of projector lens 24 is fixed and fitted into a front ring-shaped groove 23 of lamp body 22. Projector lens 24 is a non-spherical lens of which both the front and the rear surfaces take a convex shape, and unlike common convex lenses, is formed in a shape in which the upper and lower portions are cut out in vertical direction by a predetermined amount. Therefore, projector lens 24 has a shape that has a horizontal width smaller than the vertical width, and is horizontally thin and long when seen from the front of the vehicle. The vertical width of projector lens 24 is, for example, about 20% to 70% of the horizontal width.

Projector lens 24 has a rear focus F1 on optical axis Ax extending in the front-rear direction of the vehicle, and is configured to project a light source image formed on the rear focal plane as an inverted image on the virtual vertical screen.

A light source 12 is disposed above optical axis Ax in lamp room 26 in a state where the light emission surface is inclined downwardly, such that light is incident directly on a first reflecting mirror 14. While a semiconductor light source such as an LED may be used as light source 12, any lamp such as a halogen lamp or a discharge lamp may also be used. The following description is provided under the assumption that the light source is an LED. The light source may be configured by one LED, as illustrated in the figure, or may be configured by a plurality of LEDs.

The first reflecting mirror 14 has an elliptical reflective surface based on a rotary ellipse positioned right under the emission surface of light source 12 and reflects the light emitted from light source 12. First reflecting mirror 14 is designed such that the focus of the elliptical reflective surface is positioned in the vicinity of rear focus F1 of projector lens 24. Therefore, almost all the light reflected from the reflective surface of first reflecting mirror 14 is incident on projector lens 24.

A shield plate 20 is disposed such that the upper end thereof is positioned in the vicinity of the focus of the elliptical reflective surface of first reflecting mirror 14 forming a horizontal cutoff line in the light distribution pattern formed on the virtual vertical screen.

A second reflecting mirror 16 disposed between first reflecting mirror 14 and shield plate 20 is configured to reflect the light which is emitted from light source 12 and not incident on first reflecting mirror 14 toward a third reflecting mirror 18. Second reflecting mirror 16 may be disposed on an elliptical line extending from first reflecting mirror 14. Second reflecting mirror 16 has an elliptical reflective surface at the side of the light source, and a focus F2 of the elliptical reflective surface is positioned above the optical axis Ax.

Third reflecting mirror 18 is positioned not to interfere with the light reflected from first reflecting mirror 14 and reflects the light reflected from the second reflecting mirror 16 toward projector lens 24. Third reflecting mirror 18 has a parabolic reflective surface based on a rotary parabolic surface and is disposed such that the focus substantially coincides with a focus F2 of second reflecting mirror 16.

By disposing light source 12 to be oriented downwardly, as in the example illustrated in FIG. 3, it is unnecessary to consider the gap between first reflecting mirror 14 and third reflecting mirror 18, and it becomes possible to dispose the third reflecting mirror in the vicinity of the optical axis. When third reflecting mirror 18 is disposed in the vicinity of the optical axis Ax, unlike the example illustrated in FIG. 2, it is possible to prevent a bright portion from being formed at the front area of a road surface due to the light reflected from third reflecting mirror 18.

Figure 5:
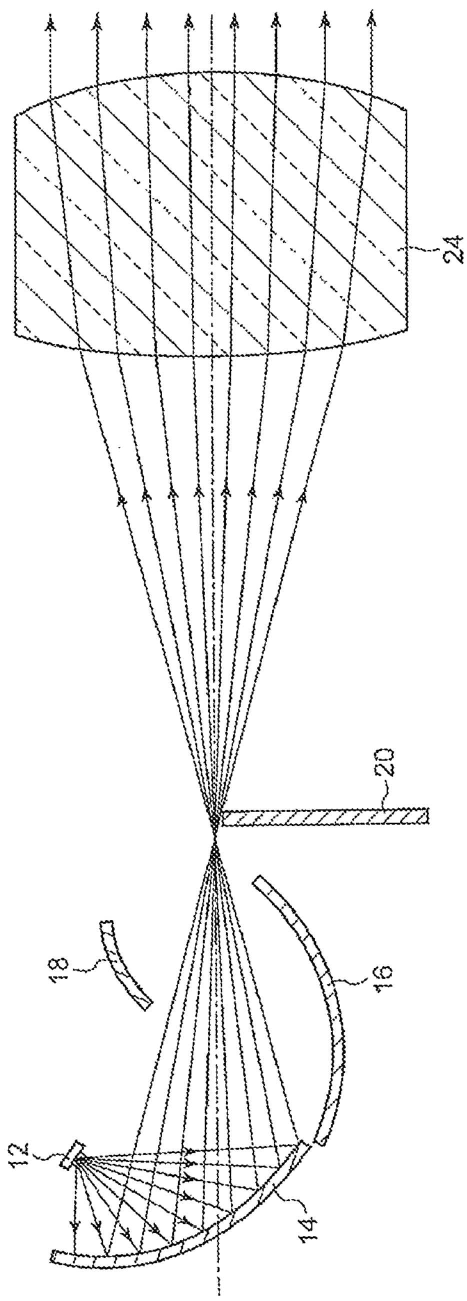
FIG. 5 is a view illustrating trajectories of light rays reflected by a first reflecting mirror.

FIG. 5 is a view illustrating the trajectories of the light reflected from first reflecting mirror 14. The light emitted from light source 12 is incident on projector lens 24 via the focus of first reflecting mirror 14 (or rear focus F1 of projector lens 24) and the incident light beams are emitted out forwardly from substantially the entire surface of projector lens 24.

Figure 6:
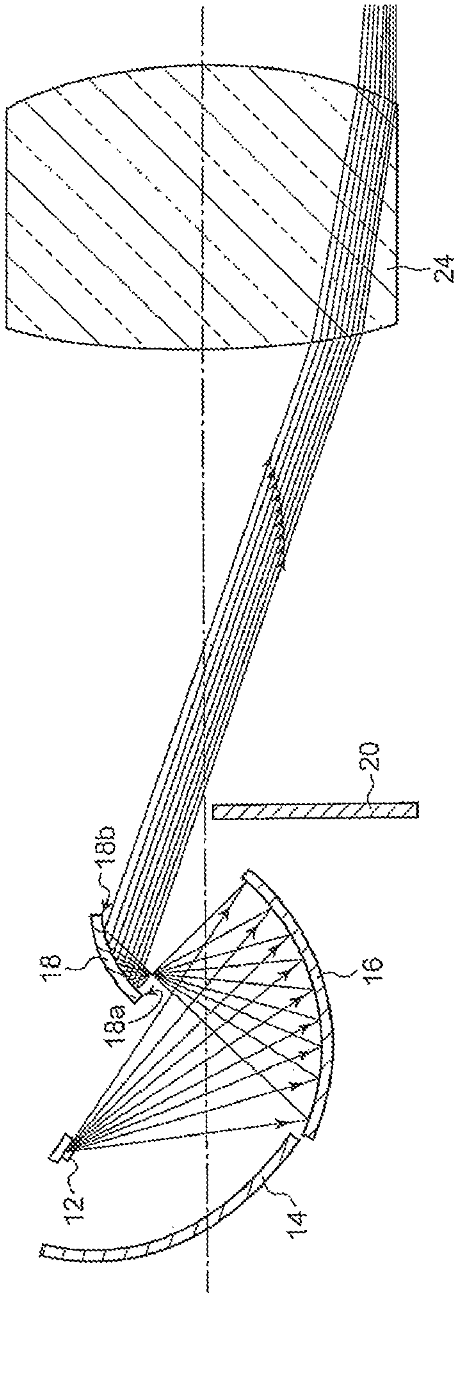
FIG. 6 is a view illustrating the trajectories of light rays reflected by a second reflecting mirror and a third reflecting mirror.

FIG. 6 is a view illustrating the trajectories of the light reflected from second reflecting mirror 16 and third reflecting mirror 18. The light which is emitted from light source 12 and not incident on first reflecting mirror 14 is incident on second reflecting mirror 16. The light having been incident on second reflecting mirror 16 is incident on third reflecting mirror 18 through focus F2 and reflected from third reflecting mirror 18 to be incident on the lower portion of projector lens 24. When the light is projected by projector lens 24, it is possible to illuminate the portion in the vicinity of the horizontal cutoff line of the virtual vertical screen.

FIGS. 7A to 7D illustrate examples of a light distribution pattern formed by vehicular headlamp 10. In the figures, the solid lines indicate a light distribution pattern C1 formed by first reflecting mirror 14, and the dotted lines indicate a light distribution pattern C3 formed by second reflecting mirror 16 and third reflecting mirror 18. C2 indicates a hot spot.

Figure 7A:
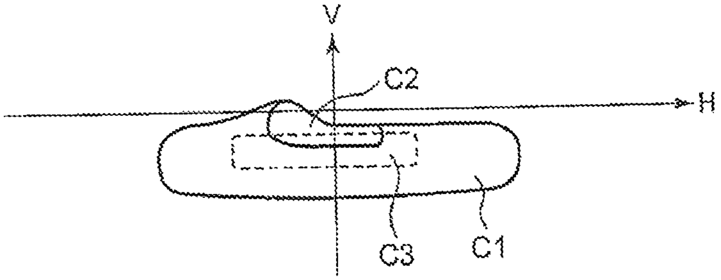
FIGS. 7A to 7D are views illustrating examples of a light distribution pattern formed by a vehicular headlamp.

FIG. 7A illustrates a light distribution pattern when the shape of the elliptical reflective surface of second reflecting mirror 16 is adjusted such that the light reflected by second reflecting mirror 16 is incident intensively on a portion 18*a* of third reflecting mirror 18 near the rear side of the vehicle. With this arrangement, it is possible to collect the light in the vicinity of the horizontal cutoff line, as illustrated by light distribution pattern C3 in the figure.

Figure 7B:
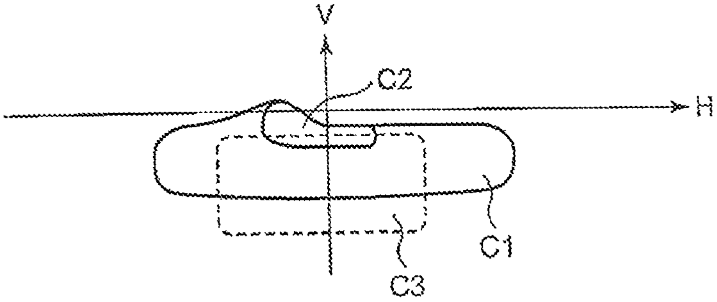

FIG. 7B illustrates a light distribution pattern when the shape of the elliptical reflective surface of second reflecting mirror 16 is adjusted such that the light flux of the light reflected from second reflecting mirror 16 gradually decreases toward a portion 18*b* of third reflecting mirror 18 near the front side of the vehicle from a portion 18*a* of third reflecting mirror 18 near the rear side of the vehicle. Accordingly, it is possible to uniformly expand light distribution pattern C3 formed by second reflecting mirror 16 and third reflecting mirror 18 in an up-and-down direction.

Figure 7C:
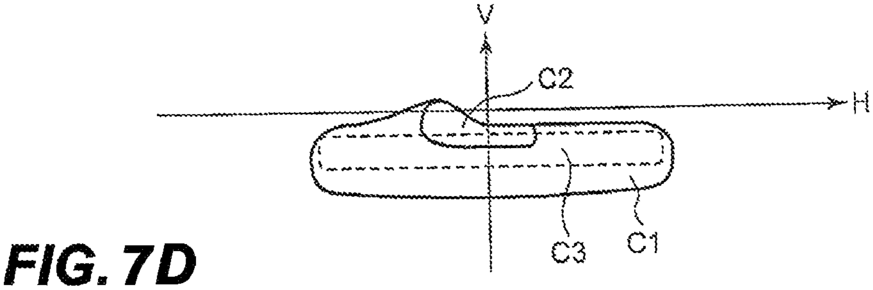

It is also possible to horizontally change the light distribution pattern by adjusting the shape of the reflective surfaces of second reflecting mirror 16 and third reflecting mirror 18. FIG. 7C illustrates a light distribution pattern when the shape of the elliptical reflective surface of second reflecting mirror 16 and the parabolic reflective surface of third reflecting mirror 18 are adjusted such that the light reflected from second reflecting mirror 16 is incident intensively on portion 18*a* of third reflecting mirror 18 near the rear side of the vehicle while being expanded horizontally. Accordingly, it is possible to expand the width of light distribution pattern C3 as compared to the example of FIG. 7A.

Figure 7D:
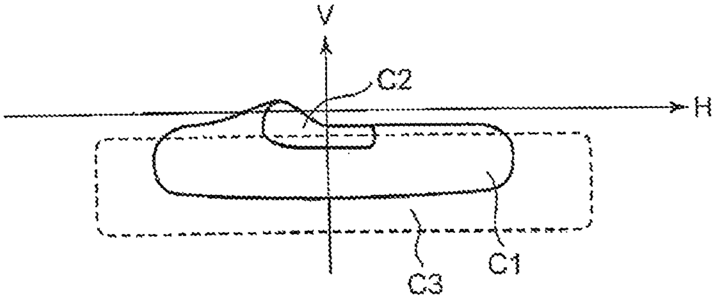

FIG. 7D illustrates a light distribution pattern when the shapes of the elliptical reflective surface of second reflecting mirror 16 and the parabolic reflective surface of third reflecting mirror 18 are adjusted such that the light flux of the light reflected from second reflecting mirror 16 decreases gradually toward portion 18*b* of third reflecting mirror 18 near the front side of the vehicle from portion 18*a* of the third reflecting mirror 18 near the rear side of the vehicle while the light reflected from second reflecting mirror is horizontally expanded. It is possible to reduce the diffusion of the light when the amount of light from the light source is small by horizontally widening light distribution pattern C3 formed by the light reflected from the second and third reflecting mirrors, as compared to light distribution pattern C1 formed by the light reflected from the first reflecting mirror, as illustrated in the figure.

As described above, according to the vehicular headlamp of an exemplary embodiment of the present disclosure, first reflecting mirror 14 is disposed right under a light source oriented downwardly such that the light flux is incident on a projector lens having a small longitudinal width as much as possible, and the light, which is reflected from first reflecting mirror 14 and not incident on the projector lens, is incident on the projector lens by second reflecting mirror 16 and third reflecting mirror 18. Therefore, it is possible to secure the same amount of light in a vehicular headlamp equipped with a convex-shape projector lens in which an upper and a lower portions are cut out by a predetermined amount, as in a vehicular headlamp equipped with a projector lens in which an upper and a lower portions are not cut out. It is also possible to prevent the front portion of a road surface from being too bright in the forward area of a vehicle by disposing third reflecting mirror 18 in the vicinity of the optical axis of the projector lens.

The present disclosure is not limited to the exemplary embodiments described above and may be modified in various ways, including the design, on the basis of the knowledge of those skilled in the art. The configurations illustrated in the figures are provided for illustrating examples and may be appropriately modified as long as the same functions can be accomplished, and the same effects can be achieved.

It may be possible to implement a low beam by adding an optical diffusion system, instead of forming the low beam with only the vehicular headlamp described in the exemplary embodiment. Also, the light distribution patterns illustrated in FIGS. 7A to 7D may be used in combination.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular headlamp designed to be installed in a vehicle comprising:

a projector lens formed in a shape where an upper portion and a lower portion thereof are cut out by a predetermined amount so that a vertical width of the projector lens in a top-down direction of the vehicle is narrower than a horizontal width of the projector lens in a left-right direction of the vehicle, and having a rear focus on an optical axis extending in a front-rear direction of the vehicle;

a light source disposed above the optical axis of the projector lens while a light emission surface is inclined downwardly;

a first reflecting mirror having an elliptical reflective surface having a focus positioned in a vicinity of the rear focus of the projector lens on the optical axis of the projector lens and configured to reflect some part of light emitted from the light source into the entire surfaces of the projector lens;

a shield plate disposed in a vicinity of the focus of the elliptical reflective surface of the first reflecting mirror and forming a horizontal cutoff line in a light distribution pattern projected from the projector lens;

a second reflecting mirror provided separately from the first reflecting mirror having an elliptical reflective surface and disposed to reflect light which is emitted from the light source but not incident on the first reflecting mirror, the elliptical reflective surface of the second reflecting mirror having a focus positioned above the optical axis of the projector lens; and a third reflecting mirror disposed above an upper end of the shield plate at a position that does not interfere with the light reflected from the first reflecting mirror, and reflecting the light reflected from the second reflecting mirror toward the projector lens, wherein the light having been incident on the second reflecting mirror is incident on the third reflecting mirror through the focus of the second reflecting mirror positioned above the optical axis of the projector lens.

2. The vehicular headlamp of claim 1, wherein the third reflecting mirror has a parabolic reflective surface, and the focuses of the reflective surfaces of the second reflecting mirror and the third reflecting mirror are positioned above the upper end of the shield plate.

3. The vehicular headlamp of claim 2, wherein a shape of the elliptical reflective surface of the second reflecting mirror is adjusted such that light is incident on the entire surface of the third reflecting mirror.

4. The vehicular headlamp of claim 2, wherein a shape of the elliptical reflective surface of the second reflecting mirror is adjusted such that light is incident intensively on a side of the third reflecting mirror, which is located near the rear side of the vehicle.

5. The vehicular headlamp of claim 2, wherein the shapes of the elliptical reflective surface of the second reflecting mirror and the parabolic reflective surface of the third reflecting mirror are adjusted such that a light distribution pattern formed by the light reflected from the third reflecting mirror is horizontally expanded as compared to a light distribution pattern formed by the light reflected from the first reflecting mirror.

6. The vehicular headlamp of claim 3, wherein the shapes of the elliptical reflective surface of the second reflecting mirror and the parabolic reflective surface of the third reflecting mirror are adjusted such that a light distribution pattern formed by the light reflected from the third reflecting mirror is horizontally expanded as compared to a light distribution pattern formed by the light reflected from the first reflecting mirror.

7. The vehicular headlamp of claim 4, wherein the shapes of the elliptical reflective surface of the second reflecting mirror and the parabolic reflective surface of the third reflecting mirror are adjusted such that a light distribution pattern formed by the light reflected from the third reflecting mirror is horizontally expanded as compared to a light distribution pattern formed by the light reflected from the first reflecting mirror.

* * * * *